(12) United States Patent
Golden et al.

(10) Patent No.: US 7,271,764 B2
(45) Date of Patent: Sep. 18, 2007

(54) TIME OF ARRIVAL ESTIMATION MECHANISM

(75) Inventors: Stuart A. Golden, Portland, OR (US); Jong-Kae Fwu, San Jose, CA (US); Steven S. Bateman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 11/172,626

(22) Filed: Jun. 30, 2005

(65) Prior Publication Data

US 2007/0018891 A1  Jan. 25, 2007

(51) Int. Cl.
*G01S 5/02* (2006.01)
*G01S 3/02* (2006.01)

(52) U.S. Cl. .................... 342/420; 342/442; 342/453

(58) Field of Classification Search .............. 342/417, 342/420, 442, 444, 446, 387, 453; 455/456.1, 455/456.5, 456.6
See application file for complete search history.

(56) References Cited

U.S. PATENT DOCUMENTS

| | | | |
|---|---|---|---|
| 5,742,635 A | * | 4/1998 | Sanderford, Jr. ............ 375/149 |
| 5,890,068 A | * | 3/1999 | Fattouche et al. ......... 455/456.2 |
| 6,078,788 A | | 6/2000 | Haardt |
| 2003/0004776 A1 | * | 1/2003 | Perrella et al. ................ 705/9 |
| 2004/0203877 A1 | | 10/2004 | Golden et al. |
| 2005/0014516 A1 | * | 1/2005 | Rached et al. ........... 455/456.1 |
| 2005/0221798 A1 | * | 10/2005 | Sengupta et al. ........... 455/411 |
| 2005/0287956 A1 | * | 12/2005 | Golden et al. .......... 455/67.16 |
| 2006/0160545 A1 | * | 7/2006 | Goren et al. ............. 455/456.1 |

FOREIGN PATENT DOCUMENTS

| EP | 1480483 A | 11/2004 |
|---|---|---|
| WO | W/O 02/41504 A2 | 5/2002 |

OTHER PUBLICATIONS

U.S. Appl. No. 10/875,368, filed Jun. 23, 2004, Golden et al.
PCT Search Report, PCT/US2006/025955, mailed Nov. 3, 2006.

* cited by examiner

*Primary Examiner*—Dao L. Phan
(74) *Attorney, Agent, or Firm*—Blakely, Sokoloff, Taylor & Zafman LLP

(57) ABSTRACT

According to one embodiment, a method is disclosed. The method includes receiving data at a first wireless radio device that has been transmitted from the first wireless radio device, receiving time stamp information from a second first wireless radio device and estimating time of arrival (TOA) information based upon the data and the time stamp information.

18 Claims, 8 Drawing Sheets

TIME OF ARRIVAL ESTIMATION MECHANISM

FIELD OF THE INVENTION

The present invention relates to mobile wireless communication; more particularly, the present invention relates to estimating a direct path (DP) distance within a multi-path environment between two mobile devices.

BACKGROUND

Within a communication system, a mobile communications device may be located using a Global Positioning System (GPS) receiver that takes positions and times from multiple satellites to accurately measure and determine distances. The mobile communications device compares its time with the time broadcast by at least three satellites whose positions are known and calculates its own position on the earth. However, the GPS system depends on expensive atomic clocks in the GPS transmitters to generate the precision measurements. Therefore, it is often impracticable to implement a satellite based GPS system to provide accurate positioning measurements in various environments.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for time of arrival (TOA) estimation is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
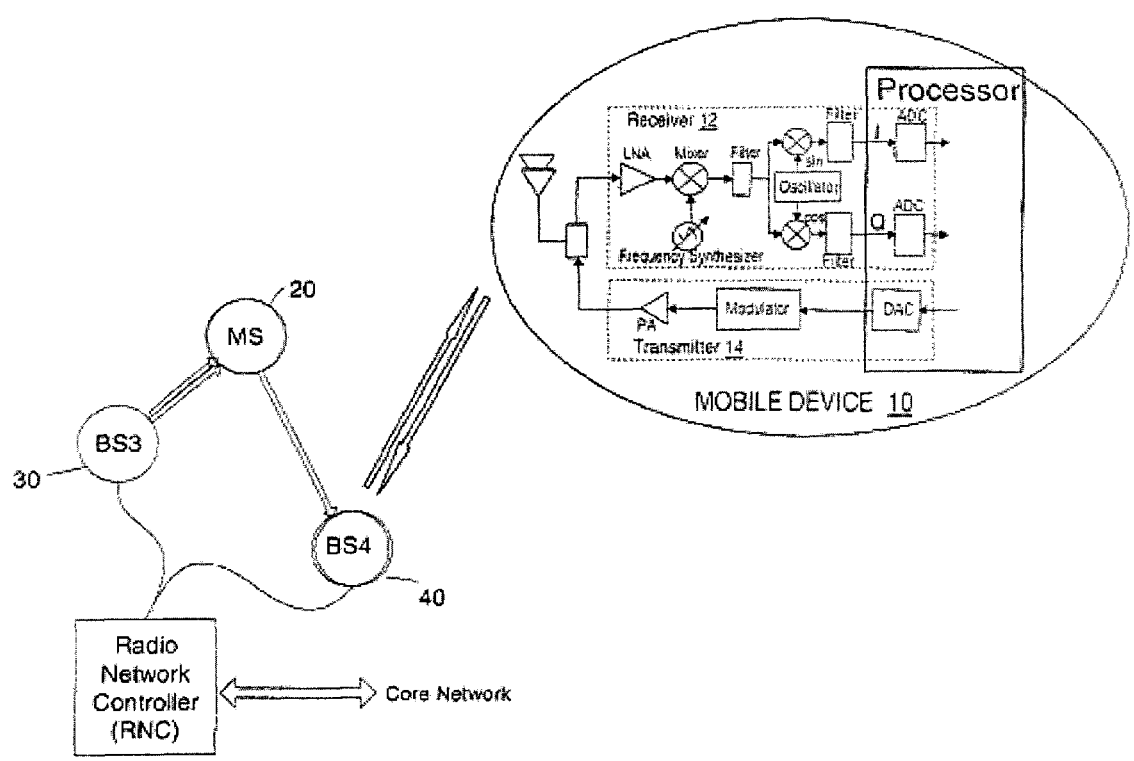
FIG. 1 illustrates a mobile wireless communications device operating in a network with other mobile devices in accordance with the present invention.

FIG. 1 illustrates one embodiment of a mobile wireless communications device 10 operating with other mobile devices. As shown in FIG. 1, the communication network may be a communication system with base stations to service multiple users within a coverage region. The multiple mobile devices may share a base station and employ a multiple access scheme such as a Code Division Multiple Access (CDMA) scheme. Wireless communications device 10 is shown communicating with base stations 30 and 40 and other mobile devices 20 in the network.

Embodiments may include packet exchanges between users of communication devices and access points in a Wireless Local Area Network (WLAN). For example, one or more mobile stations or an access point may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition. Embodiments may be adapted to communicate in accordance with one or more protocols contemplated by various IEEE 802.16 standards for fixed or mobile wireless metropolitan area networks (WMANs). (WiMax Worldwide Interoperability for Microwave Access is not really part of the standard name, it's a certification for products that are compliant with 802.16 standards.) Note that the type of communication network and the type of multiple accesses employed by devices that emit RF signal energy are provided as examples only, and the various embodiments of the present invention are not limited to the embodiment shown in the figure.

Wireless communications device 10 includes a receiver 12 to receive a modulated signal from one or more antennas. The received modulated signal may be frequency down-converted, filtered, then converted to a baseband, digital signal. The frequency conversion may include Intermediate Frequency (IF) signals, but it should be noted that in an alternative embodiment the modulated RF signals may be directly down-converted without the use of IF mixers. The scope of the claims is intended to cover either embodiment of the receiver. The down converted signals may be converted to digital values by Analog-to-Digital Converters (ADCs).

Wireless communications device 10 further includes a transmitter 14 having a Digital-to-Analog Converter (DAC) that converts a digital value generated by the processor to an analog signal. The analog signal may be modulated, up-converted to RF frequencies and amplified using a power amplifier (with or without feedback control) to control the output power of the analog signal being transmitted from the antenna(s).

Although shown in a wireless communications device 10, embodiments of the present invention may be used in a variety of applications. It should be pointed out that the timing acquisition embodiments are not limited to wireless communication devices and include wire-line communication devices. The present invention may be incorporated into microcontrollers, general-purpose microprocessors, Digital Signal Processors (DSPs), Reduced Instruction Set Computing (RISC), Complex Instruction-Set Computing (CISC), among other electronic components. In particular, the present invention may be used in smart phones, communicators and Personal Digital Assistants (PDAs), medical or biotech equipment, automotive safety and protective equipment, and automotive products. However, it should be understood that the scope of the present invention is not limited to these examples.

Wireless communication systems typically operate over a channel that has more than one path from transmitter to the receiver. Such a channel is frequently referred to as a multi-path channel. These signals travel through various paths that may be caused by reflections from buildings, objects, or refraction. At the receiver end, these various signals are received with different attenuations and time delays associated with its travel path.

Figure 2:
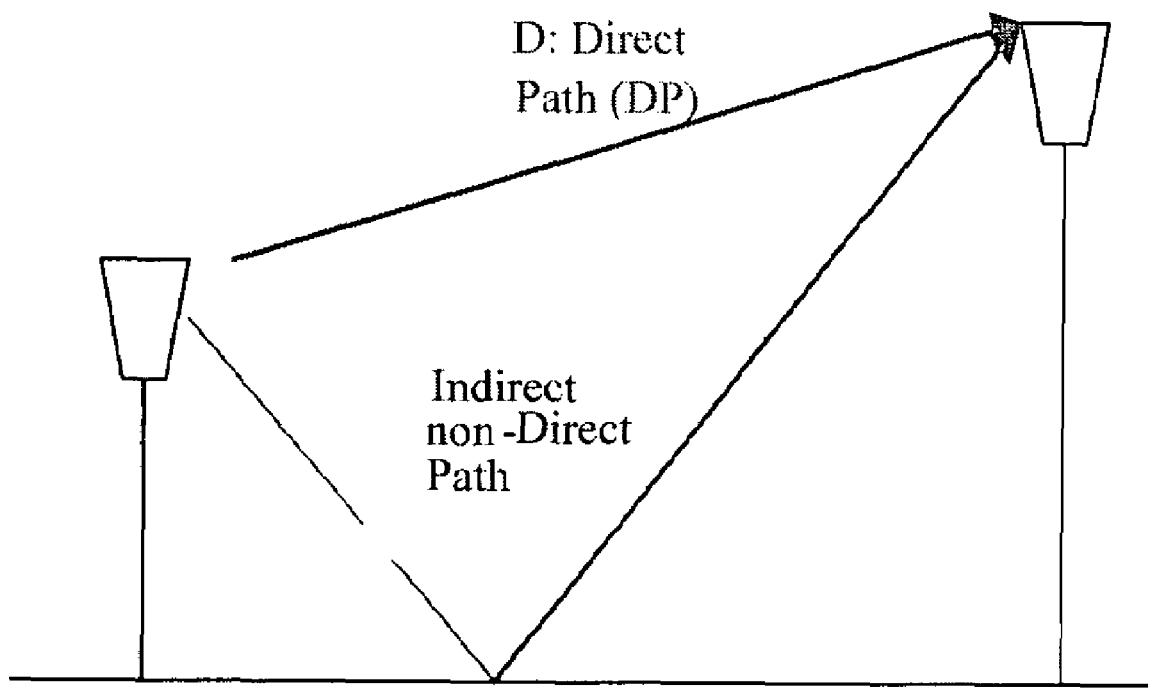
FIG. 2 illustrates one embodiment of a two-ray multi-path model.

FIG. 2 is a simple two-ray multi-path model, which illustrates the concept of a multi-path environment. In FIG. 2, one signal is received via a Direct Path (DP), and another signal is received by way of a reflected path (indirect path). The direct DP signal can be interfered destructively by the indirect path signal. As a result, the multi-path environment introduces significant challenges for many wireless communications systems, which require reliable processing/estimation of the transmit/receive signals.

In a multi-path system, the receiver receives signals from different paths with different attenuations and delays and is expressed by:

$$y(t) = \sum_{i=1}^{M} A_i s(t - \tau_i) + w(t),$$

where s(t) denotes a reference transmit ranging signal and y(t) the received signal at the receiver. M denotes the number of paths, $A_i$ and $\tau_i$ denote attenuation and delay associated with the i-th path, respectively. Here, w(t) is the composite noise due to the impairment of the transmit/receiver, and channel. The DP signal is the first signal such that $\tau_i$ is the smallest since the DP signal takes the most direct path. However, the multi-path estimation algorithm above may classify noise as possible signal as well. For example, if $\tau_1$ is the shortest delay and $A_1$ is very small, the algorithm may have overestimated the true number of paths and essentially attempts to fit the signal to the residual noise.

According to one embodiment, TOA techniques are implemented to determine the DP signal ($\tau_{DP}$) in order to compute the direct path distance between the transmitter and receiver. The distance and TOA relationship is given by $\tau_{DP}=D/c$, where D and c are the distance and the velocity of propagation, respectively. In such an embodiment, the DP distance within a multi-path environment is estimated when only one device (e.g., the receiver) has received data packets and the other side (e.g., the transmitter) has received time stamps only.

Figure 3:
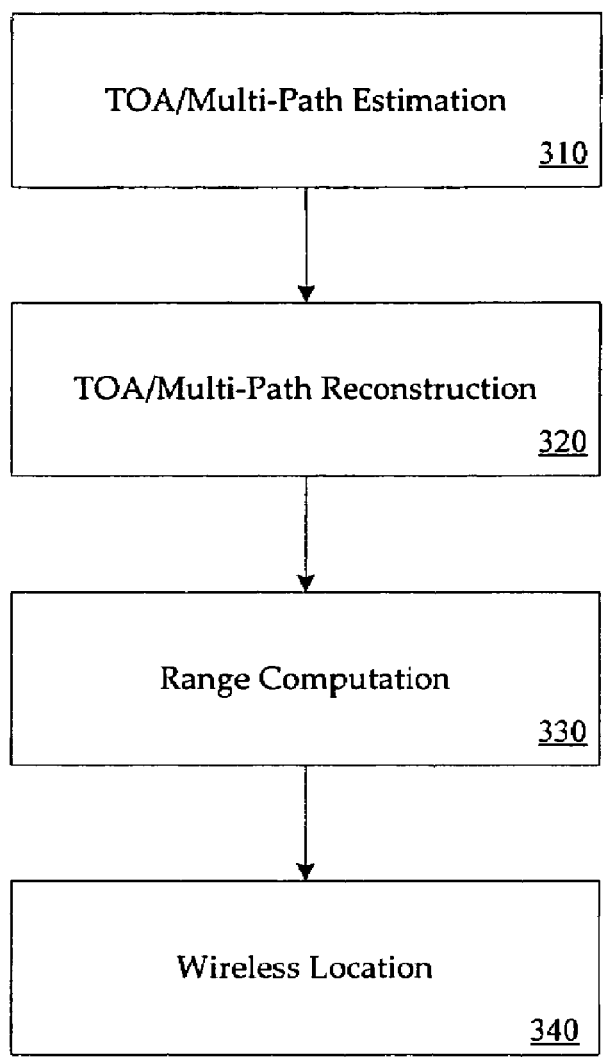
FIG. 3 is a flow diagram that illustrates one embodiment of a time of arrival (TOA) estimation mechanism.

FIG. 3 is a flow diagram that illustrates one embodiment of computing a DP distance between a transmitter and receiver. The process to perform the computation includes a process 310 to provide a TOA/multi-path estimation to a received packet data. Process 310 stores the estimated parameters (e.g., number of path, TOA of each path) for future calculations.

A process 320 is included to provide TOA/Multi-Path Reconstruction. For a two way ranging system, signals that travel from a first transceiver to a second transceiver have some similar properties as the signal travel from the second transceiver to the first transceiver (e.g., power attenuation, air travel time, etc). Thus, process 320 applies the symmetric property between the forward and reverse multi-path link to time-stamp information in order to re-construct the multi-path profile parameters for the other transceiver.

Range computation is provided at process 330 by utilizing the multi-path profiling information from processes 310 and 320 to compute the distance between the transceivers. Wireless location is provided at process 340 so that the location of the wireless radio unit can be determined with ranging to a number of different radios. In some embodiments, the process described herein or portions thereof may be performed by a mobile station, a processor, or an electronic system. The processes are not limited by the particular type of apparatus, software element, or system performing the method. The various actions may be performed in the order presented, or may be performed in a different order and in some embodiments, some actions listed in FIG. 3 may be omitted.

TOA/Multi-Path Estimation

Figure 4:
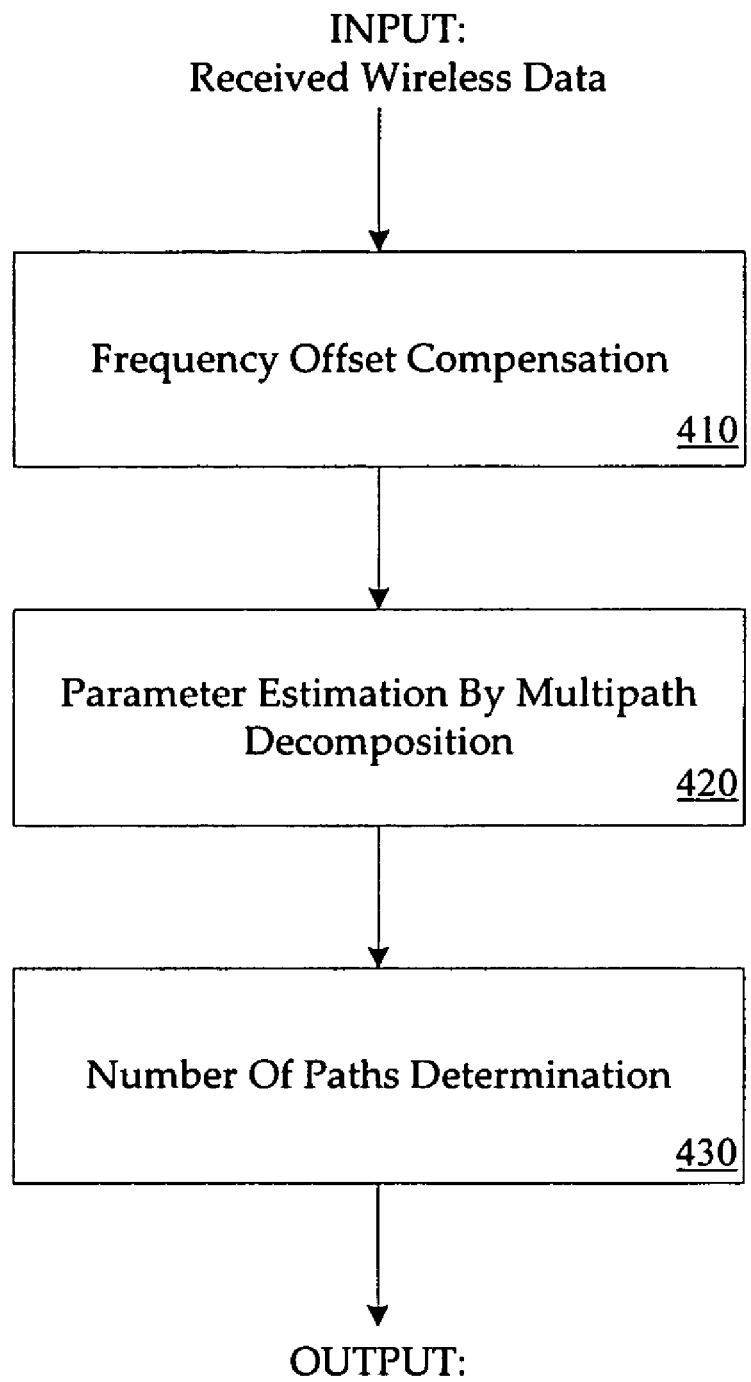
FIG. 4 is a flow diagram that illustrates one embodiment for time TOA/multi-path estimation.

FIG. 4 is a flow diagram illustrating one embodiment of a process for providing TOA/Multi-path estimation. The process to provide TOA/Multi-path estimation includes a process 410 to provide frequency offset compensation; a process 420 that decomposes the received signal into components associated with various paths and provides parameter estimation by multi-path decomposition; and a process 430 to determine the number of paths in the received signal. According to one embodiment, an initial timing acquisition process may be performed prior to process 410. Initial timing acquisition is based on signals communicated between two RF devices such as two mobile devices, two base stations, one mobile device and one base station, or in general, any two wireless communication units having a transmitter and a receiver.

Frequency Offset Compensation

In process 410 a frequency offset compensation value is calculated to correct the frequency offset between a received signal and a reference signal, e.g., a signal from a remote modem. Signals are sensitive to carrier frequency offset between the transmitter and the receiver local oscillators, which may cause self interference, for example, between the subchannels, e.g., modulated subcarriers in an OFDM modulation format. Carrier frequency offset between transmitter and receiver local oscillators may be estimated and compensated at the receiver.

Let $y_n$ be the discrete sampled received data and $s_n$ be the reference data at discrete time n. The relationship between the received signal and the reference signal may be represented as:

$$y_n = A_1 s_{n-\tau_1} \times \exp(j\omega n) + e_n,$$

where $A_1$ is the signal amplitude, $\tau_1$ is the delay taken to the nearest sample, $\omega$ is the frequency offset between the received signal and the reference signal, and $e_n$ is the noise sampled at time n.

To estimate the frequency offset, the following least-square cost function is minimized:

$$(\hat{A},\hat{\omega}) = \min_{(A,\omega)} \|y_n - As_n \times \exp(j\omega n)\|^2,$$

where $(\hat{A},\hat{\omega})$ represent "estimated values" for amplitude and frequency offset.

The cross-product $z_n = y_n s_n^*$ can be defined. Note that the value for $z_n$ does not have to be recomputed for each hypothesized frequency value that is used.

The estimated amplitude is given by:

$$\hat{A} = \frac{\sum zn \exp(-j\omega n)}{\sum |sn|^2},$$

and the estimated frequency offset may be obtained by a searching algorithm using:

$$\hat{\omega} = \arg\min/\omega \Sigma |yn|^2 - |\hat{A}|^2 \Sigma |sn|^2.$$

The estimated frequency offset is then applied to the received signal for frequency offset correction.

Parameter Estimation by Multi-path Decomposition

Once the frequency offset is compensated, the multi-path signals are estimated (both DP and indirect path) and specific properties in the signals are observed to select the DP signal. Further, the process estimates the dominant multi-path component sequentially to achieve a fast solution. The process of estimating the multi-path profile for TOA estimation is not limited to the proposed multi-path decomposition method. It will be understood other approaches can also be used with the TOA estimation mechanism, such as optimal multi-path join-estimation.

The decomposition process 420 sequentially estimates multi-paths based on the energy ratio of the signal component and the noise component (ESNR). With the ESNR generated for each of the multi-path signals, the decomposition process arranges the signal components from the strongest ESNR to the weakest ESNR. Since a low ESNR may result in poor estimation performance, the decomposition executed in process 420 accounts for low ESNR issues in accordance with the present invention. Accordingly, the attenuated receive signals obstructed by objects and/or the non-LOS signal energy/power that is substantially greater than that of the LOS signal is accounted for in process 420.

In the decomposition algorithm, $\hat{y}_i(t)$ represents the signal used for estimating the i-th path component. During the decomposition process for the i-th path, the strongest signal $\hat{y}_i(t)$ is estimated and removed from the residual signals. The estimation problem is formulated by an iterative process with first letting r(t)=y(t), then $$(\hat{A}_i, \hat{\tau}_i) = \min(\hat{A}_i, \hat{\tau}_i) \int_t \|r(t) - Ais(t - \tau i)\|^2,$$

The final estimate becomes:

$$Z(\omega) = r(\omega) * S*(\omega)$$

$$\hat{A}i = \frac{\sum |Z(\omega)\exp(-j\omega\tau i)|^2}{\sum_\omega |S(\omega)|^2},$$

Where $$\hat{\tau}i = \arg\min/\tau \sum_\omega |r(\omega)|^2 - |\hat{A}i|^2 \sum_\omega |S(\omega)|^2.$$

Again, note that $Z(\omega)$ is only computed once per minimization. Note that the iteration is repeated with:

$$r(t) = r(t) - \hat{A}i * s(t - \hat{\tau}i).$$

The decomposition associated with process 420 may be generalized to an M-path example without a specific signal strength relationship between paths. The determination of the number of paths M, and the selection of the DP signal is illustrated in preparation for the final estimation of TOA for the DP signal. Let A1>A2>A3 . . . , and by way of example, assume that the DP signal is the third strongest signal, i.e., $Y_{LOS}(t) = A_3 s(t - \tau_3)$.

In this example the DP signal has a smaller ESNR than either of the two other indirect paths. The mechanism for selecting the number of paths M and the DP signal is described later, but assume that these parameters are known. The decomposition algorithm first estimates the strongest signal component $y_1(t) = A_1 s(t - \tau_1)$ and stores the information. The value $\hat{Y}_1(t)$ is removed from y(t) and the remaining signal becomes residual error $r(t) = y(t) - \hat{y}_1(t)$. After separating the $\hat{y}_1(t)$ from the received signal y(t), the second strongest signal component $y_2(t)$ is then estimated from r(t). The same procedure is repeated for the i-th path until i=M. The time-of-arrival information $\tau_{LOS}$ is obtained from $\hat{Y}_{LOS}(t) = \hat{A}_{LOS} s(t - \hat{\tau}_{LOS})$, where LOS=3 in this example.

Figure 5:
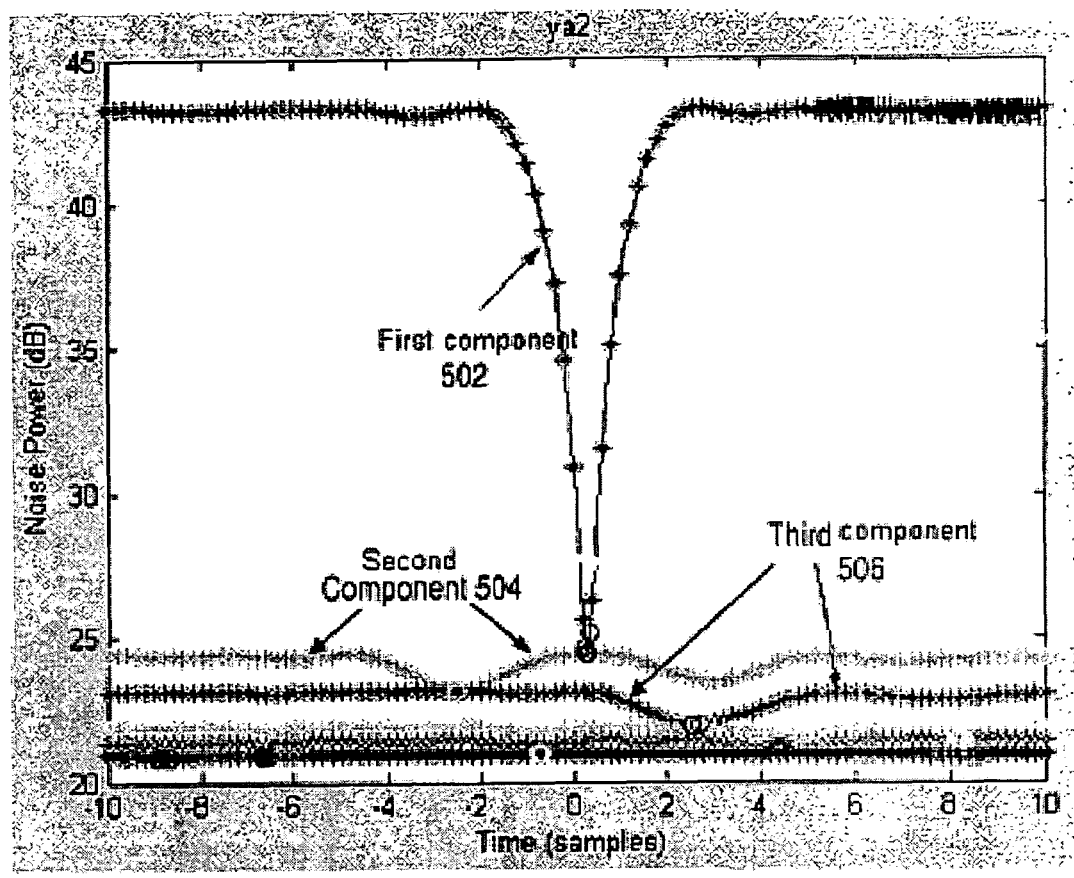
FIG. 5 is a diagram of noise power used in determining the number of paths for channel signals using residual error techniques.

FIG. 5 illustrates a residual signal/noise power plot for several path components. The Y-axis represents the residual signal/noise power and the X-axis represents the estimated delay $\tau_i$, associated with an i-th path. During the decomposition process, the ESNR is estimated for each of the component signals and the strongest signal $\hat{y}_i(t)$ at a time is determined and removed from the residual error. Note that the residual signal/noise decreases as the number of paths increases. In the example illustrated in FIG. 5, the first component 502 is shown as the strongest path among the M-path signals, second component 504 the next strongest path, followed by third component 506.

As previously stated, the decomposition associated with process 420 sequentially estimates multi-paths based on ESNR. As shown in FIG. 5, first component 502 has the strongest ESNR and in accordance with the decomposition algorithm is selected for removal. Following the removal of first component 502, the residual noise of the remaining components is significantly lower. Note that the residual noise of the remaining components is about 20 dB lower after removing the first path signal.

Process 420 continues by sequentially estimating the remaining multi-paths based on ESNR. In this example, the second component 504 is the remaining multi-path signal having the strongest ESNR. This second path signal (second component 504) is then removed and the residual noise of the remaining components further drops by a few dB. As shown in the figure, the third component 506 is the component selected from the remaining components as having the strongest ESNR. After removing the third component 506, the residual noise of the remaining components drops an additional few dB.

Number of Paths Determination

Now returning to FIG. 4 and continuing with process 430, the number of paths in the received signal that affect the residual signal is determined. Continuing with the example, the residual noise power for the remaining components is relatively flat which shows that there is no clear effect on removing any other multi-path component on the residual signal. Thus, a threshold in the residual noise power or a residual change limit may be used to determine the number of paths in the received signal. In the above example, three paths have been shown to affect the final residual noise power. Selecting additional components and removing them would not significantly reduce the residual signal, and therefore, the number of effective multi-path is determined to be three, i.e., M=3.

Multi-Path Reconstruction

Figure 6A:
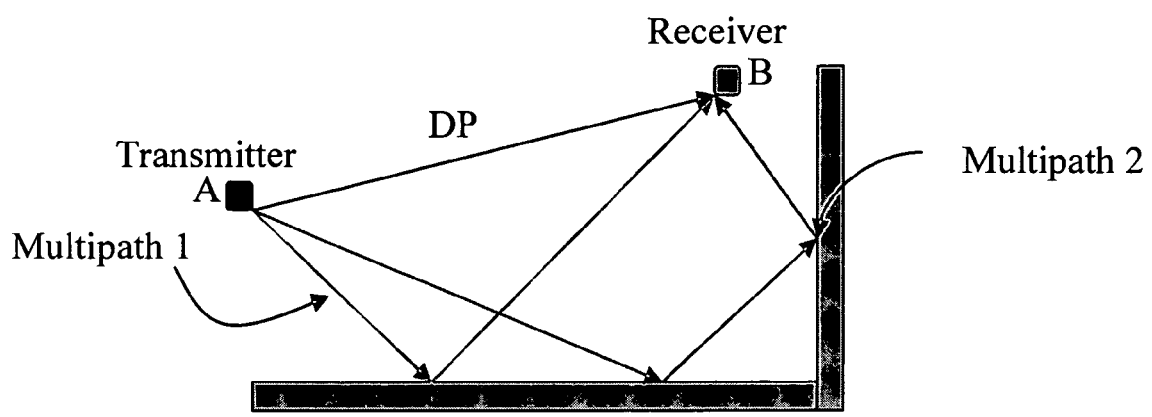
FIGS. 6A and 6B is a diagram illustrating multi-path symmetry.

Referring back to FIG. 3 and continuing with process 320, TOA/multi-path reconstruction is performed after multi-path estimation has been completed. Whenever a wireless radio transmits wireless signals, the signals can be thought of as a bundle of individual light rays which are traveling in all directions. Each individual light ray of the bundle follows the law of reflection. Not all the rays will reach the receiver. The top figure of FIG. 6A illustrates an example of a three paths scenario (DP, multi-path 1, and multi-path 2) between transmitter-A and receiver-B. The signal transmitted from transmitter-A will travel in all directions and only three paths will reach the receiver-B following the law of reflection. All other paths do not reach receiver B or are completely attenuated before reach receiver B.

Figure 6B:
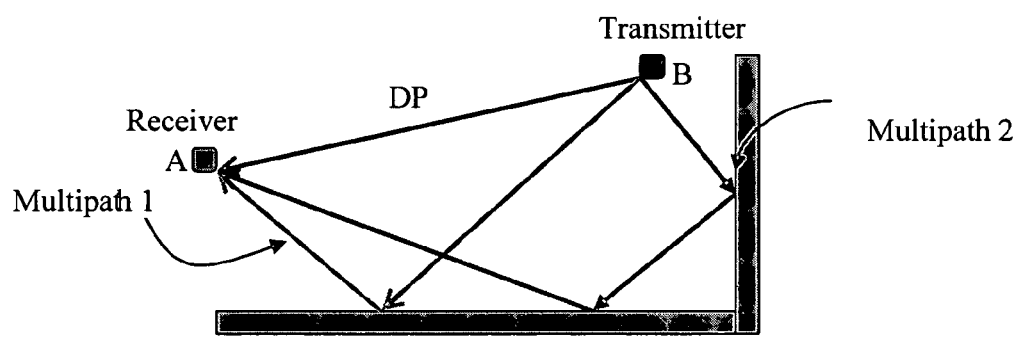

When the transmitter and receiver are reversed (e.g., the transmitter becomes the receiver and the receiver becomes the transmitter as shown in FIG. 6B), the reverse will happen, such that the rays from the new transmitter-B will travel in all directions, with only some of the rays reaching the new receiver-A. Based on the law of reflection (e.g., the angle of incidence is equal to the angle of reflection), the rays that will reach the new receiver will follow the same paths (although in the reverse direction) as the previous example. Thus, the signal transmitted from transmitter-B will travel in all directions and only three paths will reach the receiver-A following the law of reflection. All other paths doe not reach receiver A, or are completely attenuated before reaching receiver A.

Based on this description it can be concluded that the multi-path profile (the paths/ray-traces, etc.) from point-A to point-B is the same as from point-B to point-A (from the multi-path observed by point-A and B). Therefore, the number of paths from point A and point B are the same as from point B and point A, the paths/ray-traces from point A and point B are the same as from point B and point A, the delay (traveling time) of each path from point A and point B is the same as from point B and point A, and the relative delay between paths from point A and point B are the same as from point B and point A.

If the multi-path profile from point A to point B and some basic information from point B to point A (such as a time-stamp associated with the strongest path) are known, the multi-path profile (from point B to point A) can be reconstructed using the multi-path symmetry property. Consequently, time stamp information is implemented to reconstruct the multi-path information.

According to one embodiment, the time stamp information is the time at which the strongest path is received. In a further embodiment, the time stamp information is generated by recording a time-stamp of a packet transmitted from a device. Particularly, the receiver 12 is turned on during transmission of the packet, while turning off low-noise amplifiers. The low-noise amplifiers may be turned off because the signal is strong without the amplifiers The multi-path reconstruction process can be generalized to M-path scenario without specific signal strength relationship between paths. An example with a specific signal strength relationship can be used to explain the process. In this example, $A_1>A_2>A_3$, $\tau_1>\tau_2>\tau_3$, where the DP signal is the third strongest signal, e.g., $Y_{LOS}(t)=A_3 s(t-\tau_3)$. Further, the DP signal is smaller than two other non-DP paths. The selection of the number of path M, and the DP signal is critical for the final estimation of TOA for the DP signal. The selection of M and DP signal is performed according to the multi-path estimation process 310 described above.

The multi-path profiling information that was computed from the previous stage includes: (a) the number of paths M; (b) the DP signal among the M paths is known (e.g., DP=3); and (c) signal strength relationship and TOA associated with each path, e.g., $A_1>A_2>A_3$, $\tau_1>\tau_2>\tau_3$. The basic concept is use the relative time offset information between the strongest path and the DP path from one unit to reconstruct the same information for the other unit using the available time-stamp associated with the strongest path.

According to one embodiment, the multi-path estimation process includes applying the multi-path estimation process, or other multi-path estimation algorithms, to the wireless data received by the first radio unit (point A to B) and estimating the multi-path profile information for each path (i.e., $A_1$, $A_2$, $A_3$, $\tau_1$, $\tau_2$, $\tau_3$). Subsequently, the TOA difference between the strongest path and the DP path (e.g., $\Delta\tau=\tau_1-\tau_3$) is estimated.

Assuming the TOA difference between the strongest and DP paths are the same (e.g.,) based on the multi-path symmetric property. Given that the time stamp associated with the strongest path at the second radio unit (point B to A) is known (e.g., $\bar{\tau}_1$.), the TOA for the DP path becomes $\bar{\tau}_3=\bar{\tau}_1-\Delta\tau$. Once the information associated with the DP for both wireless radio units becomes available ($\tau_3$ and $\bar{\tau}_3$), the range between the two wireless radio units can be computed, as will be explained in process 330 below.

Note that the above example only illustrates re-constructing the path information using multi-path symmetry property. The information calculated using the TOA technique will be used for ranging/location application. Other multi-path profile information can be re-constructed for different applications if needed. Further, the multi-path reconstruction using symmetry property can apply to other multi-path estimation algorithms and is not limited to the TOA/multi-path estimation process discussed above. Some examples include forward and reverse link in the wireless communication multi-input multi-output (MIMO) and smart antenna applications.

Range Computation

Figure 7:
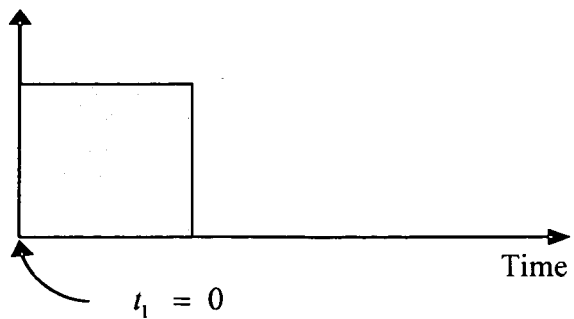
FIGS. 7-10 illustrate signals being transmitted and received by two communication devices.

Referring back to FIG. 3 and continuing with process 330, distance is computed using the estimated delay between two links (forward and reverse links). The basic relationship between the distance and the delay are described based on the example described below. In this example, a first wireless radio unit (Unit #1) transmits a packet to a second wireless radio unit (Unit #2) at time t=0, FIG. 7. Subsequently, Unit #2 responses to the Unit #1 packet at time t=D. Thus, the distance between Unit #1 and Unit #2 (e.g., $d_{12}$) is to be estimated using the previous multi-path decomposition example.

Figure 8:
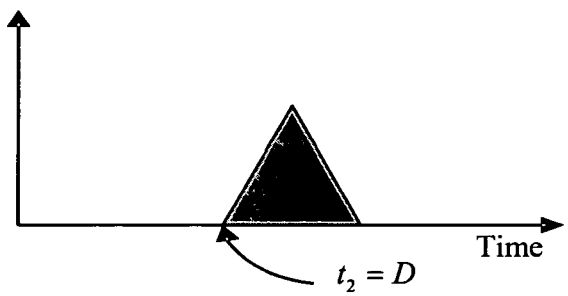
Figure 9:
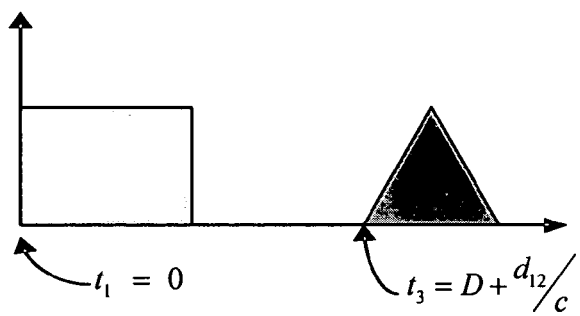

First, Unit #1 receives its own transmit packet immediately (e.g., $t_1=0$) and the response packet from Unit #2 at a time D (FIG. 8) after a delay associated the propagation path (distance) between the Unit #1 to Unit #2 $t_3=D+d^{12}/_c$ (FIG. 9). Since the self-received packet has very low noise and without multi-path, no multi-path decomposition process needs to be performed, $t_1=0$. A multi-path decomposition is applied to the response packet from Unit #2, and the time associated with the DP path is recorded, e.g., $t_3=D+d^{12}/_c=\tau_{DP}=\tau_3$.

Figure 10:
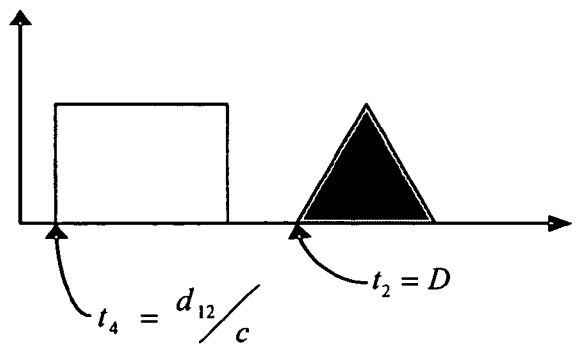

Next, Unit #2 receives Unit #1's transmit packet after a delay ($t_4 = d\ ^{12}/_c$) associated the propagation path (distance), FIG. 10. Unit #2 received its own packet with no delay ($t_2 = D$). The self-received packet for Unit #2 does not have multi-path so the self-received time-stamp $t_2 = D$. The remote received time-stamp is estimated from the strongest path $\bar{\tau}_1$ and is sent back to Unit #1 or the location server. Note that the only information sent back is the time-stamp. Without sending the wireless data packet, multi-path reconstruction can be performed.

Based on the multi-path symmetric property described in the previous example, the TOA for the DP path at unit #2 is $t_4 = d\ ^{12}/_c = \bar{\tau}_3 = \bar{\tau}_1 - \Delta\tau$. Given $t_1$, $t_2$, $t_3$, and $t_4$, the distance $d_{12}$ between unit #1 and unit #2 can be computed by $d_{12} = (m_1 - m_2)/2$, where, $$m_1 = t_3 - t_1 = D + d\ ^{12}/_c$$

$$m_2 = t_2 - t_4 = D - d\ ^{12}/_c$$

Once the $m_1$ and $m_2$ values are known, the two unknowns D and $d_{12}$ can be solved (c is the speed of radio wave and is known).

Wireless Location

Figure 11:
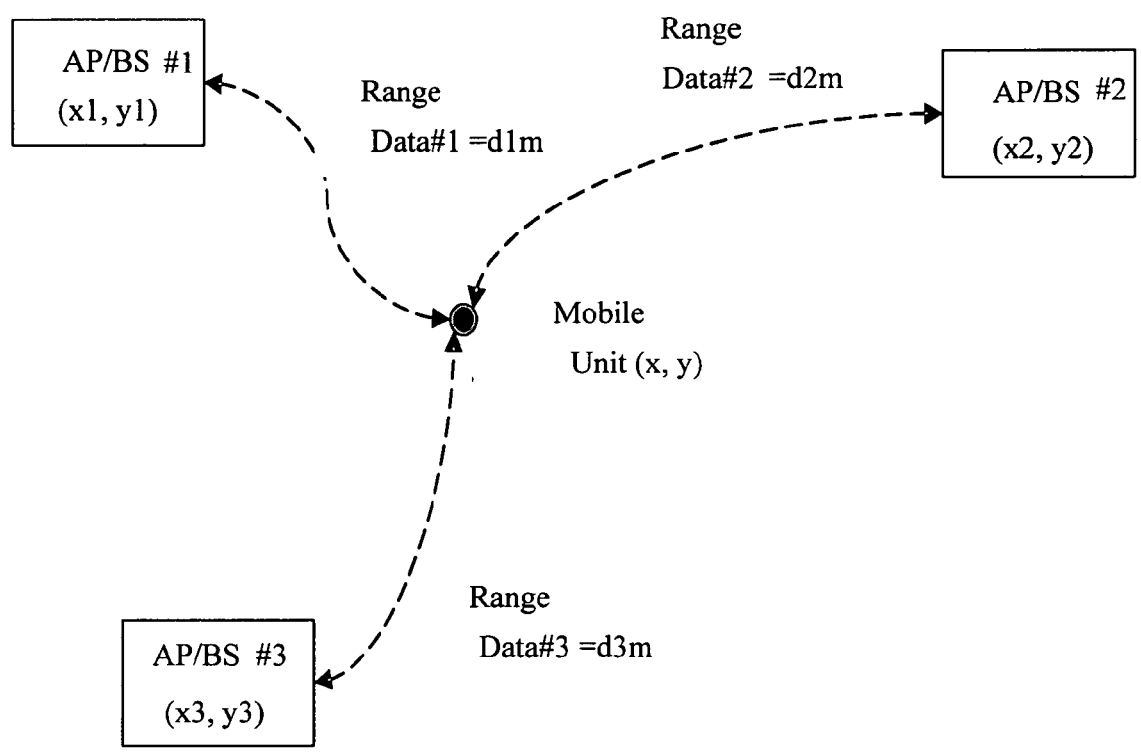
FIG. 11 is a diagram illustrating one embodiment for determining wireless location.

Referring back to FIG. 3 and continuing with process 340, wireless location information is estimated using three or more different range measurements. According to one embodiment, a mobile user performs two-way ranging at each access point (AP)/base one at a time. The position is calculated after two-way ranging using a triangulation approach which minimizes the mean square error criterion. FIG. 11 is a diagram illustrating one embodiment for determining wireless location.

Referring to FIG. 11, a mobile unit is at location (x, y) while AP/BS #1-3 are at locations (x1, y1), (x2, y2) and (x3, y3), respectively. Estimated range data for each AP/BS is represented by $d_{1m}$, $d_{2m}$, $d_{3m}$. From the known AP/BS location, and estimated range data, the mobile's position (x, y) can be determined by solving the triangulation equations:

$$\sqrt{(x-x_1)^2+(y-y_1)^2} = d_{1m}$$

$$\sqrt{(x-x_2)^2+(y-y_2)^2} = d_{2m}$$

$$\sqrt{(x-x_3)^2+(y-y_3)^2} = d_{3m}$$

The above-described mechanism enables a mobile to use its own algorithm to estimate multi-path information using TOA techniques without the involvement of access points. Consequently, the client may estimate its range from the access point using the estimations, or simply estimate its location. Note that instead of computing the location at the client/mobile side, for different applications or usage models the location may also be computed at the AP/base-station side or at the network server using a similar triangular method.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
    receiving data at a first wireless radio device that has been transmitted from the first wireless radio device;
    receiving time stamp information from a second wireless radio device;
    performing a decomposition process on the received data to determine multi-paths between the first wireless radio device and the second wireless radio device; and
    estimating time of arrival (TOA) information based upon the data received from the first wireless device and the time stamp information received from the second wireless device.

2. The method of claim 1 further comprising reconstructing the multi-path profile between the first wireless radio device and the second wireless radio device.

3. The method of claim 2 wherein the multi-path profile is reconstructed using the time stamp information received from the second wireless radio device.

4. The method of claim 3 wherein the time stamp information is generated at the second wireless radio device by:
    activating a receiver at the second wireless radio device during a signal transmission; and
    deactivating one more amplifiers at the second wireless radio device.

5. The method of claim 3 wherein the multi-path profile is further reconstructed using a symmetry property between the first wireless radio device and the second wireless radio device.

6. The method of claim 2 further comprising estimating a range between the first wireless radio device and the second wireless radio device.

7. The method of claim 6 further comprising estimating the location of the first wireless radio device using the range estimation.

8. The method of claim 1 wherein the decomposition process comprises:
    performing frequency compensation;
    performing parameter estimation; and
    determining a number of paths.

9. A wireless communication device comprising:
    a transmitter to transmit data;
    a receiver to receive at least a portion of the transmitted data and to receive time stamp information from a second wireless device; and
    a processor coupled to the transmitter and receiver to estimate time of arrival (TOA) information based upon the received data transmitted from the transmitter and the time stamp information received from the second wireless device and to perform a decomposition process on the received data to determine multiple paths between the device and the second wireless device.

10. The device of claim 9 wherein the processor reconstructs the multi-pat profile between the device and the base station using the time stamp information received from the base station and symmetry properties between device and the base station.

11. The device of claim 10 wherein the processor estimates a range between the device and the base station.

12. The device of claim 11 wherein the processor estimates the location of the device using the range estimation.

13. An article of manufacture including one or more computer readable media that embody a program of instructions, wherein the program of instructions, when executed by a processing unit, results in the process of:
    receiving data at a first wireless radio device that has been transmitted from the first wireless radio device;

receiving time stamp infounation from a second wireless radio device;

performing a decomposition process on the received data to determine multi-paths between the first wireless radio device and the second wireless radio device; and estimating time of arrival (TOA) information based upon the data received from the first wireless device and the time stamp information received from the second wireless device.

14. The article of manufacture of claim 13 wherein the program of instructions, when executed by a processing unit, further causes reconstructing the multi-path profile between the first wireless radio device and the second wireless radio device using the time stamp information received from the base station and symmetry properties between device and the base station.

15. The article of manufacture of claim 14 wherein the program of instructions, when executed by a processing unit, further causes estimating a range between the first wireless radio device and the second wireless radio device.

16. The article of manufacture of claim 15 wherein the program of instructions, when executed by a processing unit, further causes estimating the location of the first wireless radio device using the range estimation.

17. A wireless communication device comprising:

a transmitter to transmit data to a base station;

a receiver to Teceive at least a portion of the transmitted data and to receive time stamp information from the base station;

a processor coupJed to the transmitter and receiver to estimate time of anival (TOA) information based upon the received data and the time stamp information and to perform a decomposition process on the received data to determine multiple paths between the device and the base station; and at least one dipole antenna coupled to the transceiver to radiate the data in the form of electromagnetic waves.

18. The device of claim 17 wherein the processor reconstructs the multi-path profile between the device and the base station using the time stamp information received from the base station and symmetry properties between device and the base station.

* * * * *

UNITED STATES PATENT AND TRADEMARK OFFICE
CERTIFICATE OF CORRECTION

PATENT NO. : 7,271,764 B2  
APPLICATION NO. : 11/172626  
DATED : September 18, 2007  
INVENTOR(S) : Golden et al.

It is certified that error appears in the above-identified patent and that said Letters Patent is hereby corrected as shown below:

Column 8, at line 10, after "is", insert --to--.

Column 10, at line 54, delete "multi-pat", and insert --multi-path--.

Column 12, at line 5, delete "Teceive", and insert --receive--.

Column 12, at line 8, delete "coupJed", and insert --coupled--.

Signed and Sealed this

Fifteenth Day of April, 2008

JON W. DUDAS  
*Director of the United States Patent and Trademark Office*